US011092083B2

(12) United States Patent
Clark et al.

(10) Patent No.: US 11,092,083 B2
(45) Date of Patent: Aug. 17, 2021

(54) PRESSURE SENSOR ASSEMBLY FOR A TURBINE ENGINE

(71) Applicant: General Electric Company, Schenectady, NY (US)

(72) Inventors: Robert Arthur Clark, Cincinnati, OH (US); Hejie Li, Mason, OH (US); Mark Rosenzweig, West Chester, OH (US); K'Ehleyr James, Sharonville, OH (US); Jorge Camacho, Queretaro (MX); Keith F. Beatty, Cincinnati, OH (US); Joshua Friedman, Jacksonville Beach, FL (US)

(73) Assignee: General Electric Company, Schenectady, NY (US)

( * ) Notice: Subject to any disclaimer, the term of this patent is extended or adjusted under 35 U.S.C. 154(b) by 709 days.

(21) Appl. No.: 15/429,573

(22) Filed: Feb. 10, 2017

(65) Prior Publication Data

US 2018/0230913 A1 Aug. 16, 2018

(51) Int. Cl.
*F01D 17/08* (2006.01)
*F02C 9/24* (2006.01)
(Continued)

(52) U.S. Cl.
CPC ............... *F02C 9/24* (2013.01); *F01D 17/08* (2013.01); *F23R 3/002* (2013.01); *G01L 9/008* (2013.01);
(Continued)

(58) Field of Classification Search
CPC ....................... F01D 17/08; F23R 2900/00013
See application file for complete search history.

(56) References Cited

U.S. PATENT DOCUMENTS 3,071,636 A * 1/1963 Clark .................. G01K 7/04
136/231
3,778,170 A * 12/1973 Howell .............. G02B 23/2476
356/241.4
(Continued)

FOREIGN PATENT DOCUMENTS

EP 1036308 B1 9/2000
EP 1288642 A2 3/2003
(Continued)

OTHER PUBLICATIONS

Jesse B. Sewell and Peter A. Sobieski, Monitoring of Combustion Instabilities: Calpine's Experience, 2005, American Institute of Aeronautics and Astronautics, pp. 147-162. (Year: 2005).*
(Continued)

*Primary Examiner* — Gerald L Sung
*Assistant Examiner* — Marc J Amar
(74) *Attorney, Agent, or Firm* — Dority & Manning, P.A.

(57) ABSTRACT

A gas turbine engine includes a liner positioned within a compressor section or a turbine section of the gas turbine engine and at least partially defining a core air flowpath through the gas turbine engine. The gas turbine engine also includes a casing at least partially enclosing the liner. Additionally, the gas turbine engine includes a pressure sensor assembly having a body, an extension member, and a pressure sensor. The pressure sensor is positioned at least partially within the body and the body is positioned at least partially on an outer side of the casing, the extension member extending from the body through a casing opening in the casing and towards a liner opening in the liner. The extension member defines a continuous sense cavity exposing the pressure sensor to the core air flowpath.

20 Claims, 7 Drawing Sheets

(51) Int. Cl.
*G01L 9/00* (2006.01)
*F23R 3/00* (2006.01)
*G01L 23/10* (2006.01)
*G01L 23/06* (2006.01)
*G01L 23/28* (2006.01)
*G01L 19/06* (2006.01)

(52) U.S. Cl.
CPC ........ *G01L 9/0076* (2013.01); *G01L 19/0681* (2013.01); *G01L 23/06* (2013.01); *G01L 23/10* (2013.01); *G01L 23/28* (2013.01); *F05D 2260/80* (2013.01); *F23N 2225/04* (2020.01); *F23R 2900/00005* (2013.01); *F23R 2900/00013* (2013.01)

(56) References Cited

U.S. PATENT DOCUMENTS

| | | | |
|---|---|---|---|
| 4,103,544 A * | 8/1978 | Beckmann | H01H 35/242 340/945 |
| 4,449,358 A | 5/1984 | Mani | |
| 4,557,106 A * | 12/1985 | Ffowcs Williams | F02C 9/34 431/1 |
| 4,711,524 A * | 12/1987 | Morey | G02B 23/26 385/117 |
| 4,815,276 A * | 3/1989 | Hansel | F01D 21/003 415/118 |
| 5,544,478 A | 8/1996 | Shu et al. | |
| 5,575,144 A * | 11/1996 | Brough | F23R 3/26 431/114 |
| 5,594,665 A * | 1/1997 | Walter | F04D 27/001 700/301 |
| 5,665,916 A | 9/1997 | Puster et al. | |
| 5,784,889 A | 7/1998 | Joos et al. | |
| 5,797,266 A | 8/1998 | Brocard et al. | |
| 6,053,048 A | 4/2000 | Keller | |
| 6,205,765 B1 | 3/2001 | Iasillo et al. | |
| 6,461,144 B1 | 10/2002 | Gutmark et al. | |
| 6,464,489 B1 | 10/2002 | Gutmark et al. | |
| 6,468,033 B1 * | 10/2002 | Weidlich | F01D 17/02 415/118 |
| 6,530,228 B2 | 3/2003 | Wilson et al. | |
| 6,550,336 B2 | 4/2003 | Brehm et al. | |
| 6,640,549 B1 | 11/2003 | Wilson et al. | |
| 6,708,568 B2 * | 3/2004 | Gleeson | F01D 21/003 73/700 |
| 6,742,341 B2 | 6/2004 | Ryan et al. | |
| 6,742,394 B1 | 6/2004 | Stuttaford et al. | |
| 6,752,018 B2 | 6/2004 | Goldmeer et al. | |
| 6,810,655 B2 | 11/2004 | Davis, Jr. et al. | |
| 6,843,061 B2 * | 1/2005 | Parker | F02C 9/28 60/772 |
| 6,848,319 B2 | 2/2005 | Gleeson et al. | |
| 6,857,320 B2 | 2/2005 | Gleeson et al. | |
| 6,880,391 B2 | 4/2005 | Matsuyama et al. | |
| 6,928,878 B1 * | 8/2005 | Eriksen | G01L 9/0042 73/724 |
| 6,973,791 B2 | 12/2005 | Handelsman et al. | |
| 6,976,351 B2 | 12/2005 | Catharine et al. | |
| 6,978,680 B2 * | 12/2005 | Gleeson | F01D 17/08 73/1.71 |
| 7,017,415 B2 | 3/2006 | Harrold et al. | |
| 7,089,746 B2 | 8/2006 | Lieuwen et al. | |
| 7,113,873 B2 | 9/2006 | Hoyte et al. | |
| 7,194,382 B2 | 3/2007 | Lieuwen | |
| 7,278,266 B2 | 10/2007 | Taware et al. | |
| 7,334,413 B2 | 2/2008 | Myhre | |
| 7,336,862 B1 | 2/2008 | Xai et al. | |
| 7,338,202 B1 | 3/2008 | Kapat et al. | |
| 7,406,820 B2 | 8/2008 | Critchley et al. | |
| 7,454,892 B2 | 11/2008 | Lieuwen et al. | |
| 7,559,234 B1 | 7/2009 | Chorpening et al. | |
| 7,582,359 B2 | 9/2009 | Sabol et al. | |
| 7,584,617 B2 | 9/2009 | Bland et al. | |
| 7,637,096 B2 | 12/2009 | Razzell et al. | |
| 7,743,599 B2 | 6/2010 | Taware et al. | |
| 7,775,052 B2 | 8/2010 | Cornwell et al. | |
| 7,853,433 B2 | 12/2010 | He et al. | |
| 7,934,924 B2 | 5/2011 | Joklik et al. | |
| 7,942,038 B2 | 5/2011 | Ziminsky et al. | |
| 7,952,154 B2 | 5/2011 | Guo et al. | |
| 7,963,154 B2 | 6/2011 | Obermeier et al. | |
| 7,966,801 B2 | 6/2011 | Umeh et al. | |
| 8,001,761 B2 * | 8/2011 | Myers, Jr. | F02C 9/28 60/39.281 |
| 8,028,512 B2 | 10/2011 | Mendoza et al. | |
| 8,125,646 B2 | 2/2012 | Lopushansky et al. | |
| 8,180,185 B2 | 5/2012 | Xia et al. | |
| 8,260,523 B2 | 9/2012 | Singh et al. | |
| 8,326,513 B2 | 12/2012 | Singh et al. | |
| 8,473,176 B2 | 6/2013 | Youngquist et al. | |
| 8,485,309 B2 | 7/2013 | Busse et al. | |
| 8,616,064 B2 * | 12/2013 | Hurst | G01L 19/0609 73/702 |
| 8,646,278 B2 | 2/2014 | Kim et al. | |
| 8,661,822 B2 | 3/2014 | Slobodyanskiy et al. | |
| 8,720,206 B2 | 5/2014 | McMahan et al. | |
| 8,742,944 B2 | 6/2014 | Mitchell et al. | |
| 8,752,434 B2 | 6/2014 | Johansson | |
| 8,776,584 B2 | 7/2014 | Hoehne et al. | |
| 8,786,857 B2 | 7/2014 | Masterson et al. | |
| 8,915,086 B2 | 12/2014 | Umeh et al. | |
| 8,919,131 B2 | 12/2014 | Singh et al. | |
| 9,080,927 B2 | 7/2015 | Hurst et al. | |
| 9,113,234 B2 | 8/2015 | Mitchell et al. | |
| 9,244,042 B2 | 1/2016 | Rank | |
| 9,279,586 B2 | 3/2016 | Bulat | |
| 9,366,189 B2 | 6/2016 | Hong et al. | |
| 9,423,317 B2 * | 8/2016 | Frost | F23R 3/46 |
| 9,435,535 B2 * | 9/2016 | Desai | F23R 3/002 |
| 9,453,767 B2 | 9/2016 | DeSilva | |
| 9,494,493 B2 | 11/2016 | Claussen et al. | |
| 2003/0024318 A1 | 2/2003 | Brehm et al. | |
| 2003/0093999 A1 * | 5/2003 | Gleeson | G01L 19/0681 60/772 |
| 2003/0144787 A1 * | 7/2003 | Davis, Jr. | F02C 7/228 701/100 |
| 2003/0159446 A1 * | 8/2003 | Parker | F02C 9/28 60/772 |
| 2004/0168520 A1 * | 9/2004 | Gleeson | F01D 17/08 73/756 |
| 2004/0200288 A1 * | 10/2004 | Gleeson | F01D 21/003 73/753 |
| 2006/0283660 A1 | 12/2006 | Cai | |
| 2007/0214797 A1 | 9/2007 | Bland et al. | |
| 2007/0271927 A1 * | 11/2007 | Myers | F23R 3/286 60/776 |
| 2008/0118343 A1 | 5/2008 | Arthur et al. | |
| 2010/0139286 A1 | 6/2010 | Gerward et al. | |
| 2010/0158670 A1 | 6/2010 | Fox | |
| 2011/0008737 A1 | 1/2011 | McManus et al. | |
| 2011/0239621 A1 | 10/2011 | Meneely et al. | |
| 2013/0213047 A1 * | 8/2013 | Desai | F23R 3/002 60/752 |
| 2013/0291552 A1 | 11/2013 | Smith et al. | |
| 2014/0007584 A1 | 1/2014 | Hong et al. | |
| 2014/0046494 A1 | 2/2014 | McAlister | |
| 2014/0144156 A1 * | 5/2014 | Lang | F02C 6/003 60/793 |
| 2014/0238033 A1 | 8/2014 | Crothers et al. | |
| 2015/0002841 A1 * | 1/2015 | Konomura | F01D 5/12 356/241.6 |
| 2015/0060563 A1 | 3/2015 | McAlister | |
| 2015/0159867 A1 | 6/2015 | Patrick et al. | |
| 2015/0160096 A1 | 6/2015 | Patrick et al. | |
| 2015/0168190 A1 | 6/2015 | DeSilva et al. | |
| 2015/0168228 A1 | 6/2015 | DeSilva | |
| 2015/0184854 A1 | 7/2015 | Frost | |
| 2015/0198097 A1 | 7/2015 | Aphale et al. | |
| 2015/0249499 A1 | 9/2015 | Sobanski | |
| 2015/0268120 A1 * | 9/2015 | Sadig | G01L 19/0609 73/707 |

(56) References Cited

U.S. PATENT DOCUMENTS

| | | | |
|---|---|---|---|
| 2015/0268121 A1 | 9/2015 | Zinn et al. | |
| 2015/0292405 A1 | 10/2015 | Pearce | |
| 2015/0377485 A1 | 12/2015 | Cha et al. | |
| 2016/0169032 A1* | 6/2016 | Porter | F01D 21/003 |
| | | | 415/118 |
| 2017/0160152 A1* | 6/2017 | Hamel | G01L 3/108 |
| 2017/0321895 A1* | 11/2017 | Kim | F23M 20/005 |
| 2018/0179956 A1* | 6/2018 | Wertz | F01D 5/186 |

FOREIGN PATENT DOCUMENTS

| | | | | |
|---|---|---|---|---|
| EP | 1990521 A1 | 11/2008 | | |
| EP | 1990579 A1 | 11/2008 | | |
| GB | 792399 A | * 3/1958 | | F01D 17/08 |
| GB | 2451144 A | * 1/2009 | | F23R 3/343 |
| KR | 2004/0037985 A | 5/2004 | | |
| WO | WO2013/042049 A1 | 3/2013 | | |
| WO | WO2015/138386 A1 | 9/2015 | | |

OTHER PUBLICATIONS

Jon S. Wilson, Sensor Technology Handbook, 2005, Elsevier Inc, pp. 435-451. (Year: 2005).*

International Search Report and Written Opinion issued in connection with corresponding PCT Application No. PCT/US2018/012539 dated Jun. 22, 2018.

European Search Report Corresponding to Application No. 18751103 on dated Sep. 3, 2020.

* cited by examiner

PRESSURE SENSOR ASSEMBLY FOR A TURBINE ENGINE

FIELD

The present subject matter relates generally to a gas turbine engine, or more particularly to a pressure sensor assembly for a gas turbine engine.

BACKGROUND

Certain combustors on aircraft engines may be particularly susceptible to combustion dynamics. Under certain engine operating conditions, significant transient pressure waves ("pings") can be present, particularly in an annular combustor. These pressure waves, if of sufficient magnitude, may cause high cycle fatigue of combustor components, long before the hardware would need to be replaced under normal operations.

One known approach to combustor dynamic issues can involve careful mapping of problem regimes using test engines with multiple combustor instrumentation pressure sensors. Aircraft fuel schedules developed from this process and subsequently programmed into engine control were expected to avoid all problem areas. Despite this mapping, however, subtle differences between engines may still adversely affect combustion dynamics behavior. These changes may be due to parameters including manufacturing variations, engine deterioration, fuel composition, or unexpected flight conditions.

Therefore, it may be beneficial to monitor combustor dynamics during fielded operation of the gas turbine engine such that modifications to one or more control parameters may be made to reduce the combustor dynamics in the event they progress above a certain threshold. However, it can be difficult to accurately measure combustor dynamics during operation given the relatively harsh conditions within a combustion chamber of the gas turbine engine.

Accordingly, features for monitoring combustion dynamics in aircraft engines are desired. Specifically, features for more accurately measuring a pressure within a combustion section of a gas turbine engine would be particularly useful.

BRIEF DESCRIPTION

Aspects and advantages of the invention will be set forth in part in the following description, or may be obvious from the description, or may be learned through practice of the invention.

In one exemplary embodiment of the present disclosure a gas turbine engine defining a radial direction and a circumferential direction is provided. The gas turbine engine includes a liner positioned within a compressor section or a turbine section of the gas turbine engine and at least partially defining a core air flowpath through the gas turbine engine. The liner defines a liner opening. The gas turbine engine also includes a casing at least partially enclosing the liner, the casing defining first, inner side along the radial direction, a second, outer side opposite the first side, and a casing opening. The gas turbine engine also includes a pressure sensor assembly comprising a body, an extension member, and a pressure sensor, the pressure sensor position at least partially within the body and the body positioned at least partially on the second side of the casing, the extension member extending from the body through the casing opening in the casing and towards the liner opening in the liner, the extension member defining a continuous sense cavity exposing the pressure sensor to the core air flowpath.

In certain exemplary embodiments the liner is an outer liner of a combustor assembly of the gas turbine engine, and wherein the casing is a combustor casing.

Additionally, in other exemplary embodiments the pressure sensor includes a diaphragm exposed to the sense cavity of the extension member, the pressure sensor further includes piezo-electric material positioned against the diaphragm opposite the sense cavity.

Moreover, in certain exemplary embodiments the pressure sensor includes a diaphragm exposed to the sense cavity of the extension member, and wherein the pressure sensor is an optical-based sensor for measuring a deflection of the diaphragm. For example, in certain exemplary embodiments the optical-based sensor may include an optical laser directed to the diaphragm.

Further, in certain exemplary embodiments the extension member defines one or more cooling holes located inward of the casing along the radial direction and outward of the liner along the radial direction.

Additionally, in certain exemplary embodiments the liner includes a ferrule, and the extension member extends into the ferrule.

Moreover, in certain exemplary embodiments the pressure sensor assembly is removably coupled to the casing.

Further, in certain exemplary embodiments the pressure sensor assembly further includes a clamp nut, wherein the clamp nut is removably coupled to the body to hold the sensor in position.

Additionally, in certain exemplary embodiments the gas turbine engine further includes a plurality of pressure sensor assemblies arranged along the circumferential direction of the gas turbine engine.

Moreover, in certain exemplary embodiments the casing opening of the casing and the liner opening of the liner are each configured as part of a borescope inspection port.

Further, in certain exemplary embodiments the liner is a liner of a high pressure turbine in the turbine section of the gas turbine engine, and wherein the casing is a turbine casing.

In another exemplary embodiment of the present disclosure, a pressure sensor assembly is provided for a gas turbine engine. The gas turbine engine defines a radial direction and includes a liner at least partially defining a core air flowpath through a compressor section or a turbine section and a casing at least partially enclosing the liner. The pressure sensor assembly includes a body configured for positioning adjacent to the casing of the gas turbine engine, and a pressure sensor positioned at least partially within the body. The pressure sensor assembly further includes an extension member extending from the body and configured to extend at least partially through a casing opening in the casing and towards a liner opening in the liner, the extension member defining a continuous sense cavity to expose the pressure sensor to the core air flowpath of the gas turbine engine.

In certain exemplary aspects the pressure sensor includes a diaphragm exposed to the sense cavity of the extension member, wherein the pressure sensor further includes piezo-electric material positioned against the diaphragm opposite the sense cavity.

Additionally, in certain exemplary aspects the pressure sensor includes a diaphragm exposed to the sense cavity of the extension member, wherein the pressure sensor is an optical-based sensor for measuring a deflection of the diaphragm. For example, in certain exemplary aspects the optical-based sensor includes an optical laser directed to the diaphragm.

Moreover, in certain exemplary aspects the extension member defines one or more cooling holes located inward of the casing along the radial direction and outward of the liner along the radial direction when the pressure sensor assembly is installed in the gas turbine engine.

Further, in certain exemplary aspects the pressure sensor assembly is configured to be removably coupled to the casing.

Additionally, in certain exemplary aspects the pressure sensor assembly further comprises a clamp nut, wherein the clamp nut is removably coupled to the body to hold the sensor in position.

Moreover, in certain exemplary aspects the liner is an outer liner of a combustor assembly of the gas turbine engine, wherein the casing is a combustor casing.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "forward" and "aft" refer to relative axial positions within a gas turbine engine, with forward referring to a position closer to an engine inlet and aft referring to a position closer to an engine nozzle or exhaust. The terms "upstream" and "downstream" refer to the relative direction with respect to fluid flow in a fluid pathway. For example, "upstream" refers to the direction from which the fluid flows, and "downstream" refers to the direction to which the fluid flows.

Figure 1:
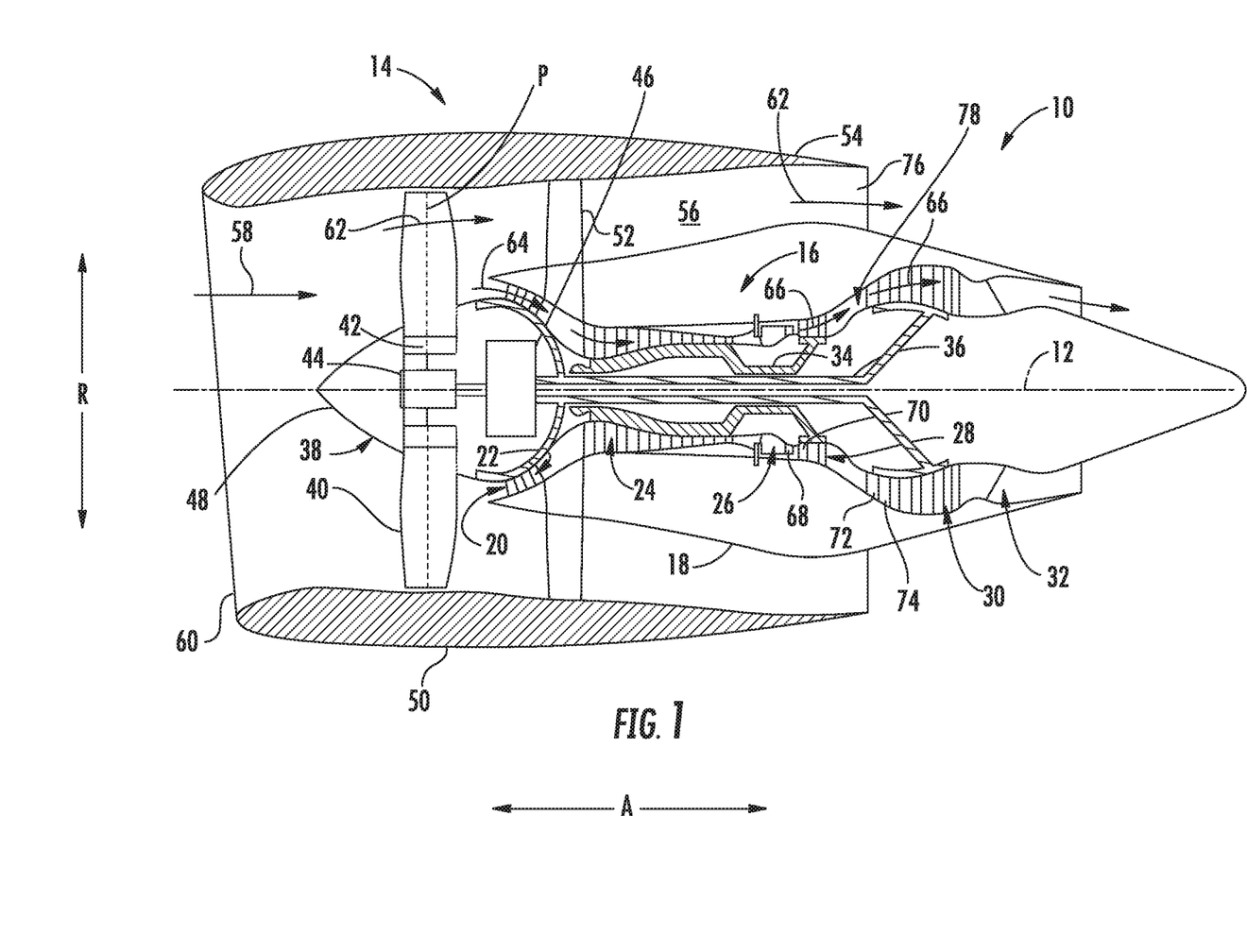
FIG. 1 is a schematic cross-sectional view of an exemplary gas turbine engine according to various embodiments of the present subject matter.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference), a radial direction R, and a circumferential direction (i.e., a direction extending about the axial direction A; not depicted). In general, the turbofan 10 includes a fan section 14 and a core turbine engine 16 positioned downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. The compressor section, combustion section 26, turbine section, and jet exhaust nozzle section 32 together define a core air flowpath 37 through the core turbine engine 16.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, the disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. The nacelle 50 is supported relative to the core turbine engine 16 by a plurality of circumferentially-spaced outlet guide vanes 52. Moreover, a downstream section 54 of the nacelle 50 extends over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed from the combustion section 26, through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, a pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated, however, that the exemplary turbofan engine 10 depicted in FIG. 1 is by way of example only, and that in other exemplary embodiments, the turbofan engine 10 may have any other suitable configuration. Additionally, or alternatively, aspects of the present disclosure may be utilized with any other suitable aeronautical gas turbine engine, such as a turboshaft engine, turboprop engine, turbojet engine, etc. Moreover, aspects of the present disclosure may further be utilized with any other land-based gas turbine engine, such as a power generation gas turbine engine, or any aeroderivative gas turbine engine, such as a nautical gas turbine engine.

Figure 2:
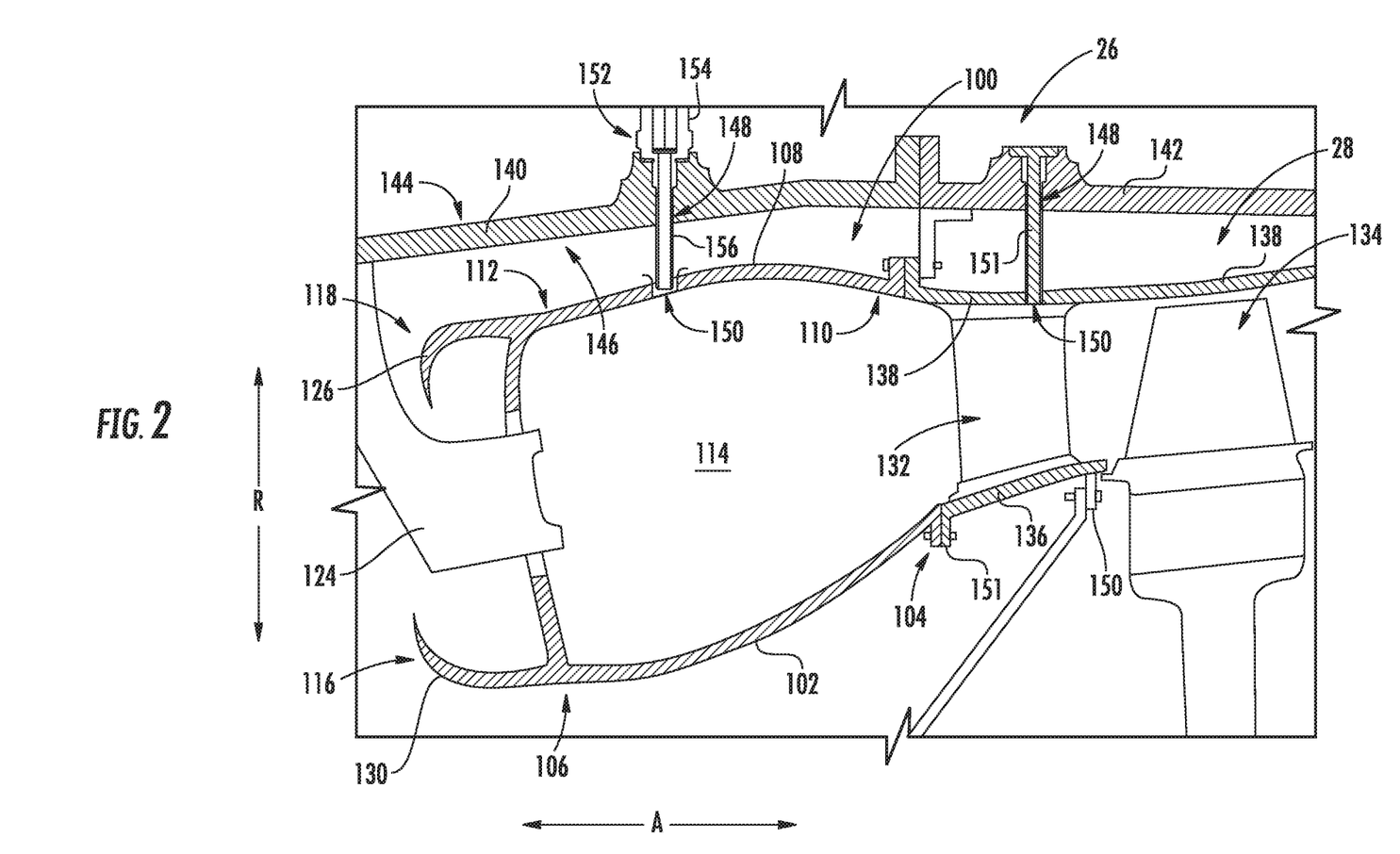
FIG. 2 is a schematic, cross-sectional view of a combustor assembly and turbine in accordance with an exemplary embodiment of the present disclosure.

Referring now to FIG. 2, a close-up, side, cross-sectional view is provided of a combustor assembly 100 and turbine in accordance with an exemplary embodiment of the present disclosure. In at least certain exemplary aspects, the combustor assembly 100 of FIG. 2 may be positioned in the combustion section 26 of the exemplary turbofan engine 10 of FIG. 1, and similarly, the turbine of FIG. 2 may be positioned in the turbine section of the exemplary turbofan engine 10 of FIG. 1.

As shown, the combustor assembly 100 generally includes an inner liner 102 extending between an aft end 104 and a forward end 106 generally along the axial direction A, as well as an outer liner 108 also extending between an aft end 110 and a forward end 112 generally along the axial direction A. The inner and outer liners 102, 108 together at least partially define a combustion chamber 114 therebetween. The inner and outer liners 102, 108 are each attached to or formed integrally with an annular dome. More particularly, the annular dome includes an inner dome section 116 formed integrally with the forward end 106 of the inner liner 102 and an outer dome section 118 formed generally with the forward end 112 of the outer liner 108. Further, the inner and outer dome section 116, 118 may each be formed integrally (or alternatively may be formed of a plurality of components attached in any suitable manner) and may each extend along the circumferential direction C (see FIG. 6) to define an annular shape.

For the embodiment depicted, the inner liner 102 and the outer liner 108 are each formed of a ceramic matrix composite (CMC) material, which is a non-metallic material having high temperature capability. Exemplary CMC materials utilized for such liners 102, 108 may include silicon carbide, silicon, silica or alumina matrix materials and combinations thereof. However, in other exemplary embodiments, one or both of the inner liner 102 and outer liner 108 may instead be formed of any other suitable material, such as a suitable metal material.

Additionally, it should be appreciated that in other embodiments, the combustor assembly 100 may not include the inner and/or outer dome sections 116, 118; may include separately formed inner and/or outer dome sections 116, 118 attached to the respective inner liner 102 and outer liner 108; or may have any other suitable configuration.

Figure 6:
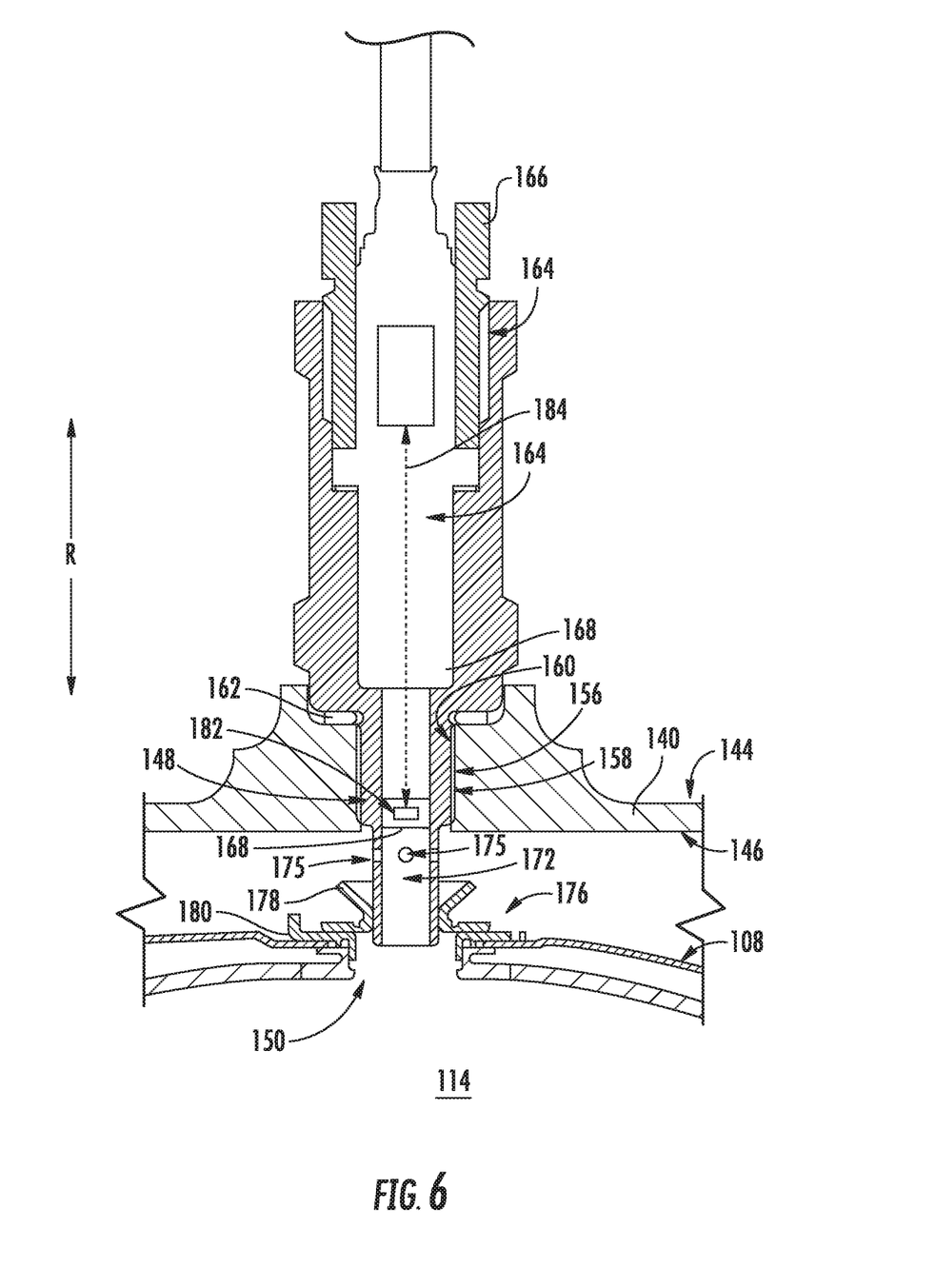
FIG. 6 is a close up, cross-sectional view of a pressure sensor assembly in accordance with yet another exemplary embodiment of the present disclosure.

Referring still to FIG. 2, the combustor assembly 100 further includes a plurality of fuel air mixers 124 spaced along the circumferential direction C (see FIG., 6, below) and positioned at least partially within the annular dome. More particularly, the plurality of fuel air mixers 124 are disposed at least partially between the outer dome section 118 and the inner dome section 116 along the radial direction R. Compressed air from the compressor section of the turbofan engine 10 flows into or through the fuel air mixers 124, where the compressed air is mixed with fuel and ignited to create the combustion gases 66 within the combustion chamber 114. The inner and outer dome sections 116, 118 are configured to assist in providing such a flow of compressed air from the compressor section into or through the fuel air mixers 124. For example, the outer dome section 118 includes an outer cowl 126 at a forward end and the inner dome section 116 similarly includes an inner cowl 130 at a forward end. The outer cowl 126 and inner cowl 130 may assist in directing the flow of compressed air from the compressor section 26 into or through one or more of the fuel air mixers 124. Again, however, in other embodiments, the annular dome may be configured in any other suitable manner.

Additionally, as is discussed above, the combustion gases 66 flow from the combustion chamber 114 into and through the turbine section of the turbofan engine 10, where a portion of thermal and/or kinetic energy from the combustion gases 66 is extracted via sequential stages of turbine stator vanes and turbine rotor blades. Notably, the turbine depicted in FIG. 2 is configured as an HP turbine 28, located immediately downstream of the combustion chamber 114 defined by the combustor assembly 100 of the combustion section 26.

As is depicted, the exemplary HP turbine 28 of FIG. 2 includes a first stage of turbine nozzles 132 positioned at a forward end of the HP turbine 28, at a location downstream of, or rather immediately downstream of, the combustion chamber 114 of the combustor assembly 100. Additionally, the first stage of turbine nozzles 132 is positioned immediately upstream of a first stage of turbine rotor blades 134. As will be described in greater detail below, the first stage of turbine nozzles 132 is configured to orient the combustion gases 66 from the combustion chamber 114 in a desired flow direction to increase a performance of the HP turbine 28. For the embodiment depicted, the first stage of turbine nozzles 132 includes a plurality of individual turbine nozzles spaced along the circumferential direction C (see FIG. 6) and extending generally along the radial direction R from an inner turbine liner 136 to an outer turbine liner 138. The inner and outer turbine liners 136, 138 at least partially define a portion of the core air flowpath 37 extending through the HP turbine 28 of the turbine section. The outer turbine liner 138 is, for the embodiment depicted, coupled to the outer liner 108 of the combustor assembly 100 at a forward end and extends aftwardly/downstream past the first stage of turbine rotor blades 134.

As is also depicted in FIG. 2, the gas turbine engine further includes a casing at least partially enclosing the outer liner 108 of the combustor assembly 100 and the outer turbine liner 138 of the HP turbine 28. More specifically, the gas turbine engine further includes a combustor casing 140 at least partially enclosing the outer liner 108 of the combustor assembly 100, as well as a turbine casing 142 at least partially enclosing the outer turbine liner 138 of the HP turbine 28. Each of the combustor casing 140 and turbine casing 142 defines a first side 146 proximate to and facing the respective liners 108, 138 (i.e., a radially inner side), a second side 144 opposite the first side 146 (i.e., a radially outer side), and a casing opening 148. Additionally, for the embodiment depicted, the outer liner 108 of the combustor assembly 100 and the outer turbine liner 138 of the HP turbine 28 also similarly include a liner opening 150. The liner openings 150 of the liners 108, 138 are substantially aligned with the casing openings 148 of the combustor casing 140 and turbine casing 142, respectively. It should be appreciated, that for the embodiment depicted, the casing openings 148 of the combustor casing 140 and turbine casing 142, as well as the liner openings 150 of the outer liner 108 and outer turbine liner 138 are configured as part of respective borescope openings, also referred to as borescope inspection ports. For example, the gas turbine engine depicted includes a borescope plug 151 positioned in the casing opening 148 of the turbine casing 142 and in the liner opening 150 of the outer turbine liner 138.

As will be appreciated, it may be beneficial during operation of the gas turbine engine to monitor a dynamic pressure within the core air flowpath 37 of the gas turbine engine. More specifically, it may be beneficial during operation of the gas turbine engine to monitor a dynamic pressure within the combustion chamber 114 of the combustor assembly 100 and/or within the core air flowpath 37 at a forward end of the HP turbine 28. Monitoring the dynamic pressure within these sections of the gas turbine engine may allow for the gas turbine engine to monitor any combustor dynamics therein, and if necessary, modify operation of the gas turbine engine to minimize such combustor dynamics.

Accordingly, for the embodiment depicted, the gas turbine engine further includes a pressure sensor assembly 152 configured to monitor a pressure within the combustion chamber 114 of the combustor assembly 100 or within the core air flowpath 37 in the HP turbine 28 (e.g., at a forward end of the HP turbine 28). More specifically, for the embodiment depicted in FIG. 2, the pressure sensor assembly 152 is configured to monitor a dynamic pressure within the combustion chamber 114 of the combustor assembly 100.

Figure 3:
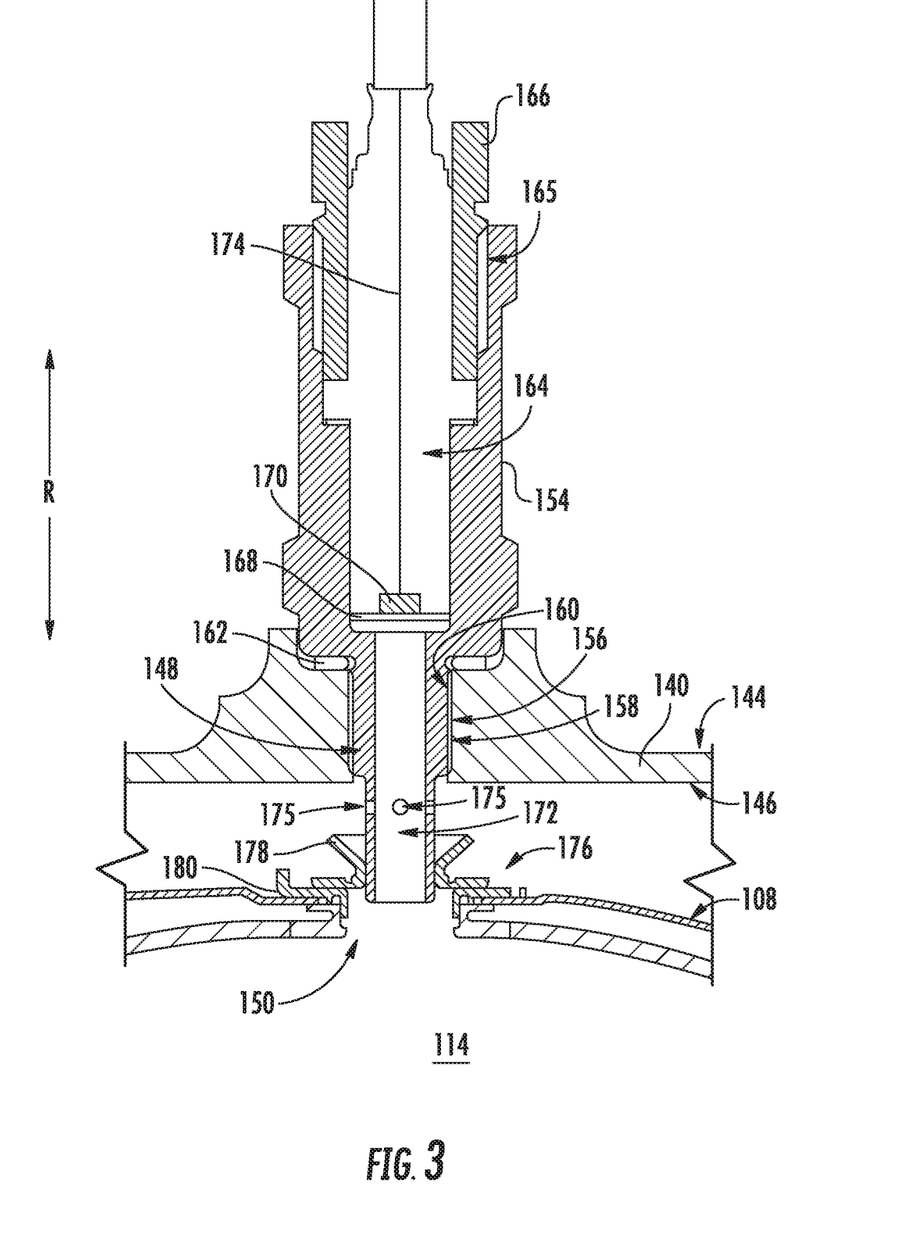
FIG. 3 is a close up, cross-sectional view of a pressure sensor assembly in accordance with an exemplary embodiment of the present disclosure.

Referring now also to FIG. 3, providing a close-up, cross-sectional view of the exemplary pressure sensor assembly 152 of FIG. 2, the pressure sensor assembly 152 generally includes a body 154 and an extension member 156. The body 154 is positioned at least partially on the second side 144 of the combustor casing 140. More specifically, for the embodiment depicted, the body 154 is positioned completely on the second side 144 of the combustor casing 140 (i.e., does not extend into or through the casing opening 148). By contrast, the extension member 156 extends from the body 154 at least partially through the casing opening 148 in the combustor casing 140 and towards the liner opening 150 and the outer liner 108 of the combustor assembly 100.

Additionally, for the embodiment depicted, the pressure sensor assembly 152 is removably coupled to the combustor casing 140. More specifically, the extension member 156 of the pressure sensor assembly 152 defines a threaded outer surface 158. The threaded outer surface 158 of the pressure sensor assembly 152 is configured to engage a threaded section 160 of the casing opening 148 in the combustor casing 140. Moreover, for the embodiment depicted, the pressure sensor assembly 152 includes a secondary retention and anti-rotation member 162 to ensure the pressure sensor assembly 152 does not come unscrewed/unattached during engine operation. For the embodiment depicted, the member 162 is configured as a tab-washer. However, in other embodiments, any other suitable member may be provided. Notably, however, in other exemplary embodiments, an outer surface of the body 154 may instead define a threaded section configured to removably attach the pressure sensor assembly 152 to a correspondingly threaded section of the casing (e.g., casing 140). Additionally, or alternatively, the pressure sensor assembly 152 may be removably coupled to the casing (e.g., casing 140) in any other suitable manner, or alternatively still, may be permanently coupled to the casing (e.g., casing 140).

Additionally, for the embodiment depicted, the extension member 156 is moveably engaged with the outer liner 108 of the combustor assembly 100. More specifically, the outer liner 108 of the combustor assembly 100 includes a ferrule 176 and the extension member 156 extends into the ferrule 176. The ferrule 176 includes a first radially outer member 178 and a second radially inner member 180. The extension member 156 is slidably received through the radially outer member 178 such that the extension member 156 may move generally along the radial direction R relative to the radially outer member 178. Additionally, for the embodiment depicted, the radially outer member 178 is slidably connected to the radially inner member 180, allowing the radially outer member 178 to move generally along the axial direction A and in the circumferential direction C relative to the radially inner member 178. Such a configuration effectively gives the extension member 156 six degrees of freedom relative to the outer liner 108 of the combustor assembly 100.

As may also be seen in FIG. 3, the pressure sensor assembly 152 further includes a pressure sensor 164. The pressure sensor 164 is positioned at least partially within the body 154 and, for the embodiment depicted, removably attached thereto. More specifically, the pressure sensor assembly 152 includes a clamp nut 166, the clamp nut 166 rotatably engaged with the body 154 through a threaded connection 165 to removably couple the pressure sensor 164 at least partially within the body 154. Again, however, the clamp nut 166 may additionally, or alternatively, be removably coupled to the body 154 in any other suitable manner.

Additionally, for the embodiment depicted the pressure sensor 164 is configured as a piezoelectric sensor. More specifically, for the embodiment depicted, the pressure sensor 164 includes a diaphragm 168 and a piezoelectric material 170 positioned against the diaphragm 168. Further, as is shown, the extension member 156 defines a continuous sense cavity 172 for exposing the pressure sensor 164 to the core air flowpath 37, or more specifically, for the embodiment depicted, for exposing the pressure sensor 164 to the combustion chamber 114 of the combustor assembly 100. Additionally, the extension member 156 defines one or more cooling holes 175 to reduce a temperature of the air within the sense cavity 172 of the extension member 156. The cooling holes 175 are positioned inward of the combustor casing 140 along the radial direction R and outward of the outer liner 108 along the radial direction R. Accordingly, the cooling holes 175 are exposed to a compressor discharge air flowing between the combustor casing 140 and outer liner 108. A pressure of the compressor discharge air may generally be higher than a pressure of the air/combustion gases within the combustion chamber 114. Additionally, a temperature of the compressor discharge air may generally be lower than a temperature of the air/combustion gases within the combustion chamber 114. Accordingly, with the configuration depicted in FIG. 3, the sense cavity 172 may fill with compressor discharge air, maintaining a temperature of the pressure sensor 164 at a lower temperature relative to a temperature within the combustion chamber 114, and below a maximum operating temperature threshold.

Referring still to the embodiment depicted in FIG. 3, the diaphragm 168 is positioned adjacent to and exposed to the sense cavity 172 of the extension member 156 and the piezoelectric material 170 is positioned against the diaphragm 168 opposite the sense cavity 172 of the extension member 156. The exemplary diaphragm 168 depicted is configured as a single layer of material, however, in other embodiments, the diaphragm 168 may instead be formed of a plurality of layers of materials. Accordingly, during operation of the gas turbine engine, the pressure fluctuations within the combustion chamber 114 are translated through the compressor exit air within the sense cavity 172 of the extension member 156 to the diaphragm 168 of the pressure sensor 164, and further to the piezoelectric material 170.

More specifically, during operation of the gas turbine engine, pressure fluctuations within the combustion chamber 114 may compress air positioned within the sense cavity 172 of the extension member 156, translating such pressure fluctuations to the diaphragm 168 of the pressure sensor 164. The pressure fluctuations translated to the diaphragm 168 cause the diaphragm 168 to deform. The deformation of the diaphragm 168, in turn, causes the piezoelectric material 170 to deform, and the deformation of the piezoelectric material 170 generates an electrical signal. The electrical signal is provided through an electrical connection line 174 of the pressure sensor 164 to, e.g., a controller (not shown) which may correlate the electrical signal to a pressure within the combustion chamber 114 of the gas turbine engine. As will be appreciated, such a pressure sensor 164 may be capable of differentiating between different frequencies and amplitudes of pressure changes/dynamics to which the diaphragm 168 is exposed, allowing the pressure sensor 164 to sense a specific frequency and amplitude of combustor dynamics within the combustion chamber 114 of the gas turbine engine, if desired.

Moreover, including a pressure sensor within a pressure sensor assembly in accordance with one more embodiments of the present disclosure may allow for the use of piezoelectric material to measure a pressure within the combustion chamber 114 of the gas turbine engine despite the elevated temperatures within the combustion chamber 114 the gas turbine engine that would otherwise prevent use of piezoelectric material.

It should be appreciated, however, that the exemplary pressure sensor assembly 152 depicted in FIGS. 2 and 3 is provided by way of example only. In other exemplary embodiments, the pressure sensor assembly 152 may have any other suitable configuration, and further may be positioned at any other suitable location within the gas turbine engine.

For example, reference will now be made to FIG. 4, providing a gas turbine engine including a pressure sensor assembly 152 in accordance with another exemplary embodiment of the present disclosure. It should be appreciated that the exemplary embodiment of FIG. 4 may be configured in substantially the same manner as the exemplary embodiment described above with reference to FIGS. 2 and 3. Accordingly, the same or similar numbers may refer to the same or similar part.

Figure 4:
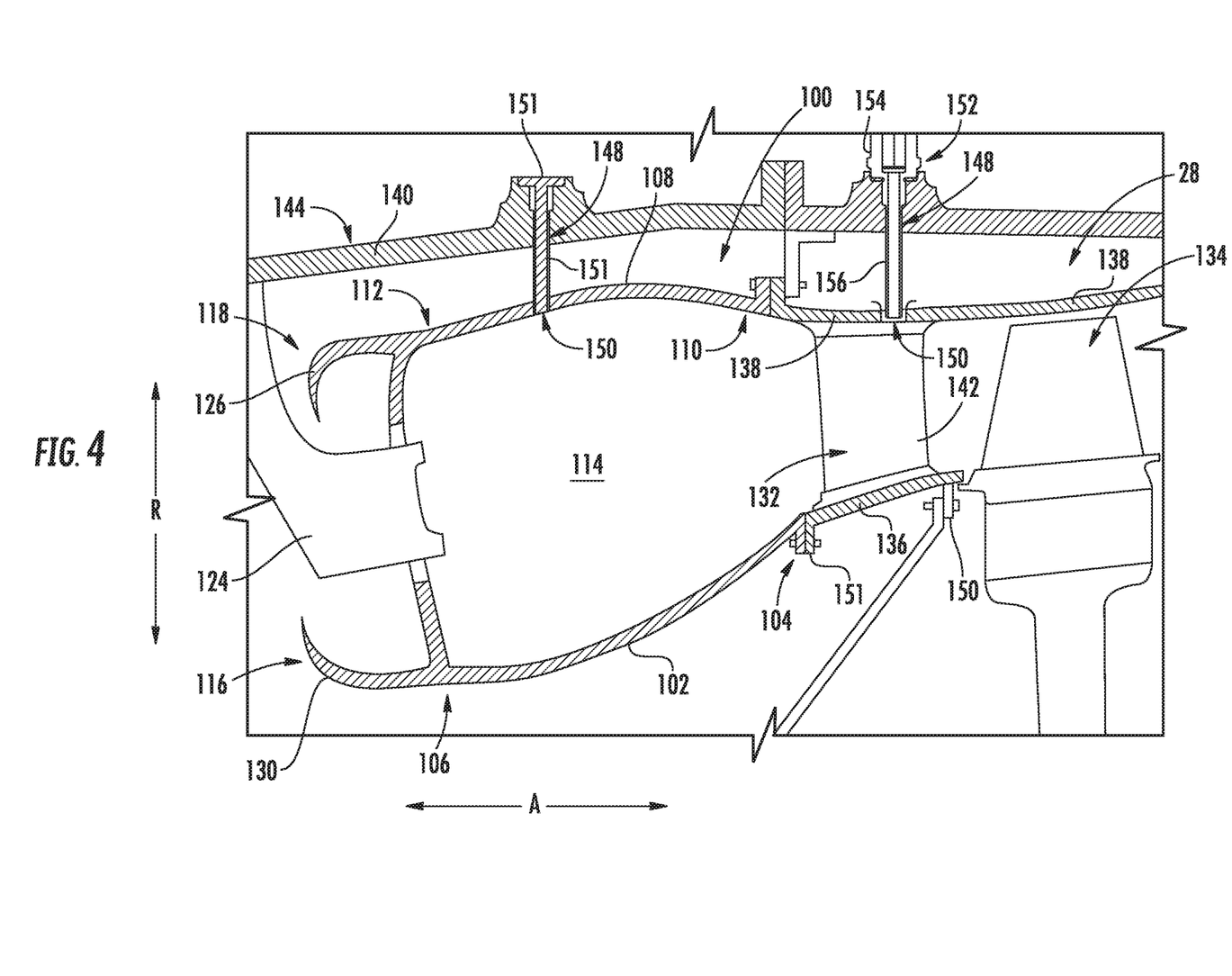
FIG. 4 is a schematic, cross-sectional view of a combustor assembly and turbine in accordance with another exemplary embodiment of the present disclosure.

As is depicted, for the exemplary embodiment of FIG. 4, the gas turbine engine includes a pressure sensor assembly 152, the pressure sensor assembly 152 including a body 154, an extension member 156, and a pressure sensor 164. The pressure sensor 164 is positioned at least partially within the body 154, and the body 154 is positioned at least partially on a second, a radially outer side 144 of a casing. Additionally, the extension member 156 extends from the body 154 through a casing opening 148 in the casing and towards a liner opening 150 in a liner. The extension member 156 defines a continuous sense cavity 172 exposing the pressure sensor 164 to a core air flowpath 37.

However, for the embodiment depicted, the casing is instead configured as a turbine casing 142 and the liner is instead configured as an outer turbine liner 138. Notably, the casing opening 148 in the turbine casing 142 and the liner opening 150 in the outer turbine liner 138 are each positioned proximate a first stage of turbine nozzles 132 (i.e., radially outward of the first stage of turbine nozzles 132, and aligned with the first stage of turbine nozzles 132 along the axial direction A). Additionally, for the exemplary embodiment depicted the pressure sensor assembly 152 has replaced a borescope plug 151, and a borescope plug 151 has been positioned in the casing and liner openings 148, 150 of the combustor casing 140 and outer liner 108, respectively (compare with FIG. 2).

Accordingly, the pressure sensor 164 of the pressure sensor assembly 152 of FIG. 4 may still be configured to detect combustor dynamics within the combustion chamber 114. It should be appreciated, however, in other exemplary embodiments the pressure sensor assembly 152 may instead be positioned at any other suitable location within the turbine section, such as at any location forward of the first stage of turbine rotor blades 134 of the HP turbine 28, or aft of the first stage of turbine rotor blades 134 of the HP turbine 28.

Figure 5:
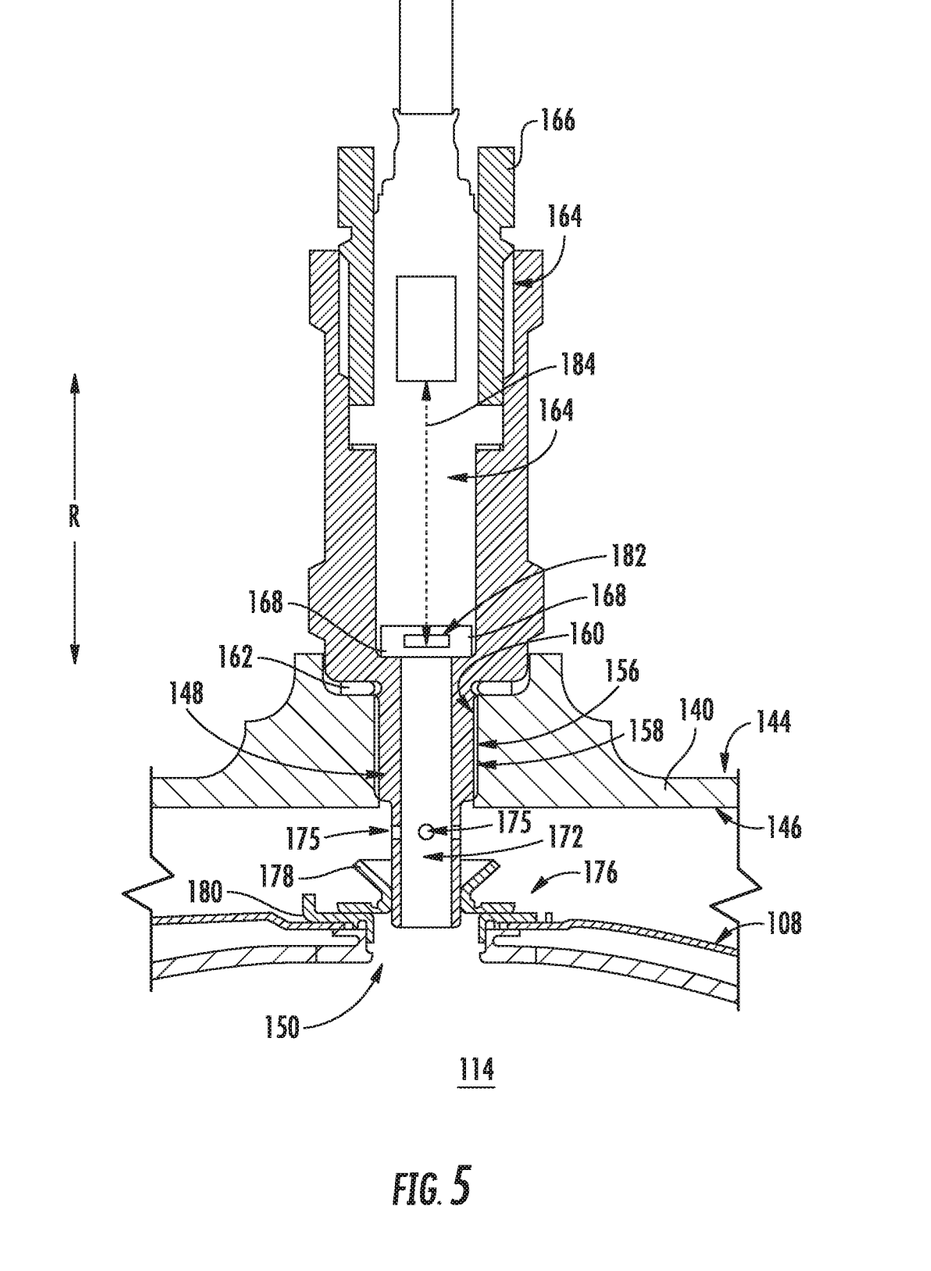
FIG. 5 is a close up, cross-sectional view of a pressure sensor assembly in accordance with another exemplary embodiment of the present disclosure.

Additionally, referring now to FIG. 5, a side, cross-sectional view of yet another exemplary embodiment of a pressure sensor assembly 152 is provided. As with the exemplary pressure sensor assembly 152 described above with reference to FIGS. 2 and 3, the exemplary pressure sensor assembly 152 of FIG. 5 includes a body 154, an extension member 156, and a pressure sensor 164. The pressure sensor 164 is positioned at least partially within the body 154 and generally includes a diaphragm 168 positioned adjacent to and exposed to the sense cavity 172 of the extension member 156.

However, for the exemplary embodiment depicted, the pressure sensor 164 is an optical-based sensor configured to measure a deflection of the diaphragm 168 to, in turn, measure pressure within the combustion chamber 114. More specifically, for the embodiment depicted, the diaphragm 168 defines an enclosed, interior cavity 182. Additionally, the optical-based sensor includes an optical laser 184 directed at the diaphragm 168, or rather, directed at the interior cavity 182 of the diaphragm 168. The optical-based sensor is configured to measure light from the optical laser 184 reflected from the internal cavity 182 of the diaphragm 168. Deformation of the diaphragm 168, and deformation of the internal cavity 182 of the diaphragm 168, changes characteristics of the light from the optical laser 184 reflected from the internal cavity 182 the diaphragm 168. Accordingly, the optical-based sensor may determine an amount of deflection/deformation of the diaphragm 168 based on the sensed characteristics of the light from the optical laser 184 reflected from the cavity 182, therefore determining a pressure within the core air flowpath 37.

Moreover, it should be appreciated that in other exemplary embodiments, the pressure sensor assembly 152 including an optical-based sensor may be configured in any other suitable manner. For example, referring to FIG. 6, a side, cross-sectional view of yet another exemplary embodiment of a pressure sensor assembly 152 is provided. The pressure sensor assembly 152 of FIG. 6 may be configured in substantially the same manner as the pressure sensor assembly 152 of FIG. 5. However, for the embodiment of FIG. 6, a diaphragm 168 of the pressure sensor assembly 152 is positioned in a sense cavity 172 of the extension member 156, such that an edge of the diaphragm 168 is substantially flush with an inner surface 146 of the casing 140. Notably, in still other embodiments, the diaphragm 168 may further be positioned even closer to the combustion chamber 114. For example in still other exemplary embodiments the diaphragm 168 may be positioned radially inward of the casing 140, e.g., such that an edge of the diaphragm 168 is substantially flush with a radially outer surface of the outer liner 108.

Figure 7:
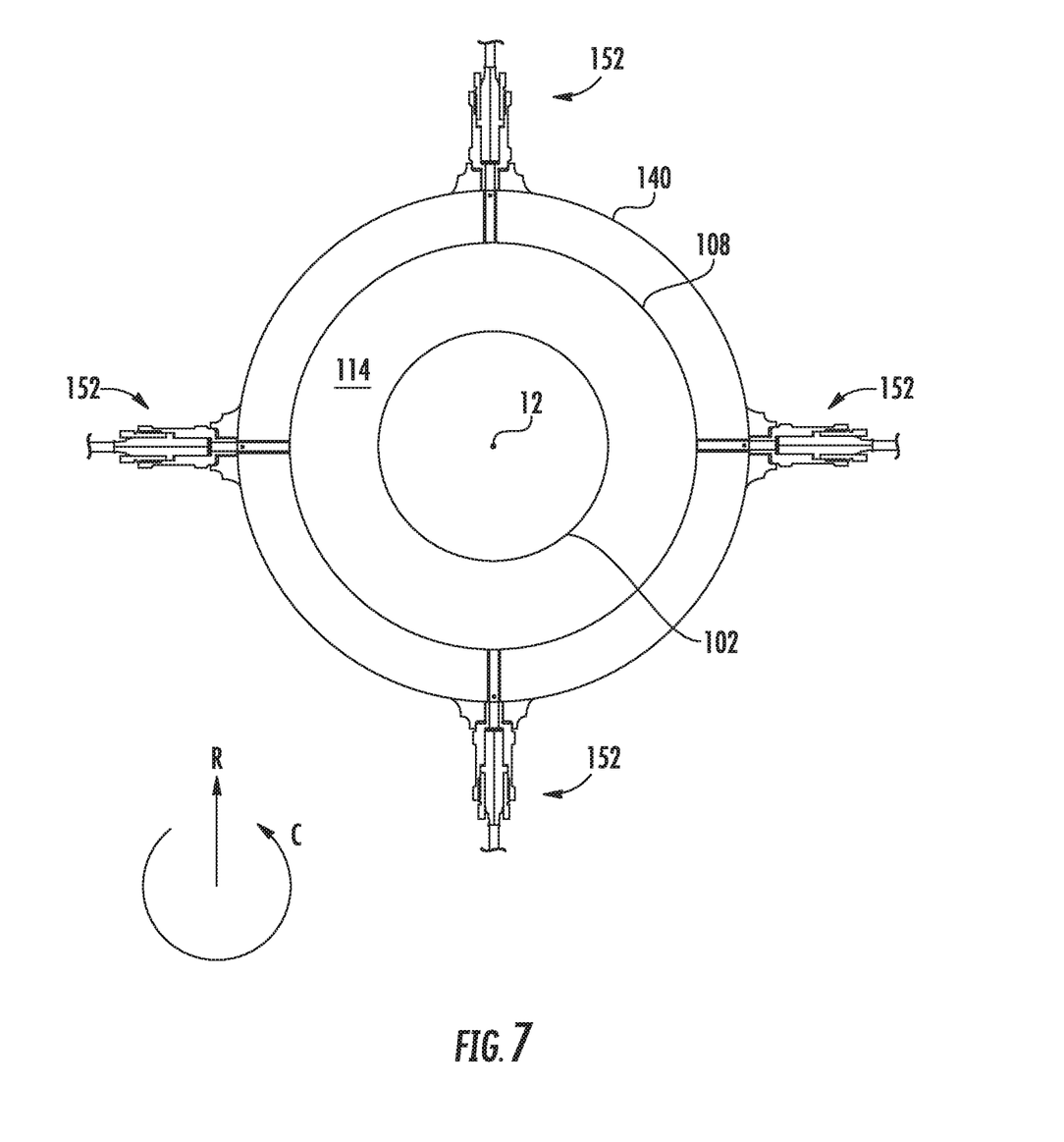
FIG. 7 is a schematic, axial view of a combustion section of the gas turbine engine including a plurality of pressure sensor assemblies in accordance with an exemplary embodiment of the present disclosure.

Furthermore, although for the embodiments described above the gas turbine engine is depicted including a single pressure sensor assembly 152, it should be appreciated that in other exemplary embodiments, the gas turbine engine may additionally include a plurality pressure sensor assemblies 152. For example, referring now briefly to FIG. 7, a schematic, axial view of a combustion section 26 of a gas turbine engine in accordance with another exemplary embodiment of the present disclosure is provided. The combustion section 26 may be configured in substantially the same manner as the exemplary combustion section 26 described above with reference to FIG. 2. For example, the combustion section 26 generally includes an outer combustor casing 140 enclosing a combustor assembly 100, the combustor assembly 100 including an outer liner 108 at least partially defining a combustion chamber 114. For the exemplary embodiment of FIG. 7, the gas turbine engine includes a plurality of pressure sensor assemblies 152 arranged along the circumferential direction C of the gas turbine engine. More specifically, for the embodiment depicted, the gas turbine engine includes four pressure assemblies 152 arranged substantially evenly along the circumferential direction C of the gas turbine engine. Such a configuration may allow for the gas turbine engine to measure combustor dynamics within the combustion chamber 114 that may vary along the circumferential direction C.

It should be appreciated, however, that in other exemplary embodiments, the gas turbine engine may include any other suitable number of pressure sensor assemblies 152 arranged in other suitable manner. Additionally, each of the plurality pressure sensor assemblies 152 depicted in FIG. 7 may be configured in substantially the same manner as one or more of the exemplary pressure sensor assemblies 152 described above with reference to FIGS. 2 through 6. Accordingly, in certain exemplary embodiments, the plurality of pressure sensor assemblies 152 may instead be positioned within the turbine section of the gas turbine engine.

Inclusion of one or more pressure sensor assemblies in accordance with an exemplary embodiment of the present disclosure with a gas turbine engine may allow for the gas turbine engine to more accurately monitor combustor dynamics within e.g., a combustion chamber of a combustion section of the gas turbine engine, or at a forward end of the turbine section of the gas turbine engine. More specifically, inclusion of one or more pressure sensor assemblies in accordance with an exemplary embodiment of the present disclosure may allow for use of more accurate pressure sensors which may otherwise be incapable of withstanding the relatively elevated temperatures within the combustion chamber of the gas turbine engine.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine engine defining a radial direction and a circumferential direction, the gas turbine engine comprising:
   a liner positioned within a combustion section or a turbine section of the gas turbine engine and at least partially defining a core air flowpath through the gas turbine engine, the liner defining a liner opening;
   a casing at least partially enclosing the liner, the casing defining a first, inner side along the radial direction, a second, outer side opposite the first side, and a casing opening; and
   a pressure sensor assembly comprising a body, an extension member, and a pressure sensor that comprises a diaphragm,
   wherein the pressure sensor is positioned at least partially within the body and the body positioned at least partially on the second side of the casing,
   wherein the extension member extends from the body through the casing opening in the casing and towards the liner opening in the liner,
   wherein the extension member defines a continuous sense cavity extending between the sensor and the core air flowpath, exposing the pressure sensor to the core air flowpath,
   wherein a radial thickness of a first portion of the casing immediately around the pressure sensor assembly is greater than a thickness of a second portion of the casing at least partially surrounding the first portion in the circumferential direction, and
   wherein the diaphragm is positioned closer to an outer surface of the first portion of the casing in the radial direction than an inner surface of the casing to the outer surface of the first portion of the casing.

2. The gas turbine engine of claim 1,
wherein the liner is an outer liner of a combustor assembly of the gas turbine engine, and
wherein the casing is a combustor casing.

3. The gas turbine engine of claim 1,
wherein the diaphragm is exposed to the sense cavity of the extension member, and
wherein the pressure sensor further comprises piezoelectric material positioned against the diaphragm opposite the sense cavity.

4. The gas turbine engine of claim 1,
wherein the diaphragm is exposed to the sense cavity of the extension member, and
wherein the pressure sensor is an optical-based sensor for measuring a deflection of the diaphragm.

5. The gas turbine engine of claim 4, wherein the optical-based sensor includes an optical laser directed to the diaphragm.

6. The gas turbine engine of claim 1, wherein the extension member defines one or more cooling holes located inward of the casing along the radial direction and outward of the liner along the radial direction.

7. The gas turbine engine of claim 1,
wherein the liner comprises a ferrule, and
wherein the extension member extends into the ferrule.

8. The gas turbine engine of claim 1, wherein the pressure sensor assembly is removably coupled to the casing.

9. The gas turbine engine of claim 1,
wherein the pressure sensor assembly further comprises a clamp nut, and
wherein the clamp nut is removably coupled to the body to hold the sensor in position.

10. The gas turbine engine of claim 1, further comprising:
a plurality of pressure sensor assemblies arranged along the circumferential direction of the gas turbine engine.

11. The gas turbine engine of claim 1, wherein the casing opening of the casing and the liner opening of the liner are each configured as part of a borescope inspection port.

12. The gas turbine engine of claim 1, wherein the extension member is moveably engaged with the liner.

13. The gas turbine engine of claim 1,
wherein the liner includes ferrule,
wherein the extension member extends at least partially into the ferrule and is slidably connected to the ferrule.

14. A pressure sensor assembly for a gas turbine engine defining a radial direction and comprising a liner at least partially defining a core air flowpath through a combustion section or a turbine section and a casing at least partially enclosing the liner, the pressure sensor assembly comprising:
a body configured for positioning adjacent to the casing of the gas turbine engine;
a pressure sensor positioned at least partially within the body and comprising a diaphragm; and
an extension member extending from the body and configured to extend at least partially through a casing opening in the casing and towards a liner opening in the liner,
wherein the extension member defines a continuous sense cavity extending between the sensor and the core air flowpath, to expose the pressure sensor to the core air flowpath of the gas turbine engine,
wherein a radial thickness of a first portion of the casing immediately around the pressure sensor assembly is greater than a thickness of a second portion of the casing at least partially surrounding the first portion in the circumferential direction, and
wherein the diaphragm is positioned closer to an outer surface of the first portion of the casing in the radial direction than an inner surface of the casing to the outer surface of the first portion of the casing.

15. The pressure sensor assembly of claim 14,
wherein the diaphragm is exposed to the sense cavity of the extension member, and
wherein the pressure sensor further comprises piezoelectric material positioned against the diaphragm opposite the sense cavity.

16. The pressure sensor assembly of claim 14, wherein the extension member defines one or more cooling holes located inward of the casing along the radial direction and outward of the liner along the radial direction when the pressure sensor assembly is installed in the gas turbine engine.

17. The pressure sensor assembly of claim 14, wherein the pressure sensor assembly is configured to be removably coupled to the casing.

18. The pressure sensor assembly of claim 14,
wherein the pressure sensor assembly further comprises a clamp nut, and
wherein the clamp nut is removably coupled to the body to hold the sensor in position.

19. The pressure sensor assembly of claim 14,
wherein the liner is an outer liner of a combustor assembly of the gas turbine engine, and
wherein the casing is a combustor casing.

20. A gas turbine engine defining a radial direction and a circumferential direction, the gas turbine engine comprising:
a liner positioned within a combustion section or a turbine section of the gas turbine engine and at least partially defining a core air flowpath through the gas turbine engine, the liner defining a liner opening;
a casing at least partially enclosing the liner, the casing defining a first, inner side along the radial direction, a second, outer side opposite the first side, and a casing opening; and
a pressure sensor assembly comprising an extension member and a pressure sensor comprising a diaphragm,
wherein the pressure sensor is positioned at least partially on the second side of the casing,
wherein the extension member extends through the casing opening in the casing and towards the liner opening in the liner,
wherein the extension member defines a continuous sense cavity extending between the sensor and the core air flowpath, exposing the pressure sensor to the core air flowpath,
wherein a radial thickness of a first portion of the casing immediately around the pressure sensor assembly is greater than a thickness of a second portion of the casing at least partially surrounding the first portion in the circumferential direction, and
wherein the diaphragm is positioned closer to an outer surface of the first portion of the casing in the radial direction than an inner surface of the casing to the outer surface of the first portion of the casing.

* * * * *